United States Patent
Castrejon, III et al.

(10) Patent No.: US 12,418,562 B2
(45) Date of Patent: Sep. 16, 2025

(54) SYSTEM FOR ACTIVE DETECTION AND MITIGATION OF UNAUTHORIZED ACTIVITY WITHIN A TECHNOLOGY INFRASTRUCTURE

(71) Applicant: BANK OF AMERICA CORPORATION, Charlotte, NC (US)

(72) Inventors: Tomas M. Castrejon, III, Fort Mill, SC (US); David Nardoni, Sierra Madre, CA (US); Christopher Daniel Birch, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 593 days.

(21) Appl. No.: 17/392,486

(22) Filed: Aug. 3, 2021

(65) Prior Publication Data
US 2023/0039302 A1 Feb. 9, 2023

(51) Int. Cl.
H04L 9/40 (2022.01)
G06N 20/00 (2019.01)

(52) U.S. Cl.
CPC .......... *H04L 63/145* (2013.01); *G06N 20/00* (2019.01); *H04L 63/1416* (2013.01)

(58) Field of Classification Search
CPC ... H04L 63/145; H04L 63/1416; G06N 20/00; G06F 21/53; G06F 21/554; G06F 21/566
See application file for complete search history.

(56) References Cited

U.S. PATENT DOCUMENTS

| | | |
|---|---|---|
| 5,335,291 A | 8/1994 | Kramer et al. |
| 5,500,513 A | 3/1996 | Langhans et al. |
| 5,519,319 A | 5/1996 | Smith et al. |
| 5,650,722 A | 7/1997 | Smith et al. |
| 5,675,253 A | 10/1997 | Smith et al. |
| 5,677,955 A | 10/1997 | Doggett et al. |
| 5,761,442 A | 6/1998 | Barr et al. |
| 5,819,226 A | 10/1998 | Gopinathan et al. |
| 5,884,289 A | 3/1999 | Anderson et al. |
| 5,903,830 A | 5/1999 | Joao et al. |
| 5,999,596 A | 12/1999 | Walker et al. |
| 6,014,645 A | 1/2000 | Cunningham |
| 6,021,943 A | 2/2000 | Chastain |

(Continued)

*Primary Examiner* — Farid Homayounmehr
*Assistant Examiner* — Mudasiru K Olaegbe
(74) *Attorney, Agent, or Firm* — Moore & Van Allen PLLC; Anup Iyer

(57) ABSTRACT

Systems, computer program products, and methods are described herein for active detection and mitigation of unauthorized activity within a technology infrastructure. The present invention is configured to continuously monitor one or more incoming messages in one or more computing devices; detect one or more assessment vectors embedded in the one or more incoming messages; initiate an isolated virtual environment; redirect the one or more incoming messages associated with the one or more assessment vectors from the one or more computing devices to the isolated virtual environment; trigger an access routine to emulate, within the isolated virtual environment, an action of accessing the one or more incoming messages; determine, based on at least the access routine, whether the one or more incoming messages is associated with malware; and display a notification to the user indicating whether the one or more incoming messages is associated with malware.

20 Claims, 3 Drawing Sheets

(56) References Cited

U.S. PATENT DOCUMENTS

| | | |
|---|---|---|
| 9,954,875 B2 | 4/2018 | Boivie |
| 10,102,372 B2 | 10/2018 | Huang et al. |
| 10,104,029 B1 | 10/2018 | Chambers et al. |
| 10,176,438 B2 | 1/2019 | Shakarian et al. |
| 10,250,617 B1 | 4/2019 | Gardner et al. |
| 10,880,322 B1 * | 12/2020 | Jakobsson ............... H04L 51/08 |
| 10,958,683 B2 | 3/2021 | Govardhan et al. |
| 11,757,914 B1 * | 9/2023 | Jakobsson ............... H04L 51/42 |
| | | 726/25 |
| 2015/0200960 A1 * | 7/2015 | Dickinson ........... H04L 63/1416 |
| | | 726/23 |
| 2016/0080414 A1 * | 3/2016 | Kolton ................ H04L 63/1491 |
| | | 726/23 |
| 2018/0216960 A1 * | 8/2018 | Doshi .................... G01D 21/00 |
| 2020/0137110 A1 * | 4/2020 | Tyler ................... H04L 63/1483 |
| 2020/0218806 A1 | 7/2020 | Cho |
| 2020/0364338 A1 | 11/2020 | Ducau et al. |
| 2021/0064745 A1 | 3/2021 | Bouguerra et al. |
| 2021/0097171 A1 * | 4/2021 | McKerchar ........... G06F 40/106 |
| 2021/0120013 A1 * | 4/2021 | Hines ................. H04L 63/1416 |
| 2022/0108025 A1 * | 4/2022 | Lo ......................... G06F 21/566 |
| 2023/0010945 A1 * | 1/2023 | Soryal ................ H04L 63/1416 |

* cited by examiner

SYSTEM FOR ACTIVE DETECTION AND MITIGATION OF UNAUTHORIZED ACTIVITY WITHIN A TECHNOLOGY INFRASTRUCTURE

FIELD OF THE INVENTION

The present invention embraces a system for active detection and mitigation of unauthorized activity within a technology infrastructure.

BACKGROUND

Malware software that is specifically designed to disrupt, damage, or gain unauthorized access to a computer system. Wrongdoers gain access to a computer network and install the malware on a computing system. Once the malware is executed (i.e., detonated) it performs a designated nefarious action, such as, misappropriate information, such as user credentials, user passwords or the like. Other forms of malware provide for backdoor access to computing systems, such that normal authentication is no longer required to access the system and, as a result the wrongdoer can remotely access resources within an application, such as databases, file servers or the like, providing the wrongdoers the ability to remotely issue system commands.

Therefore, the is a need for a system for active detection and mitigation of unauthorized activity within a technology infrastructure.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for active detection and mitigation of unauthorized activity within a technology infrastructure is presented. The system comprising: at least one non-transitory storage device; and at least one processing device coupled to the at least one non-transitory storage device, wherein the at least one processing device is configured to: continuously monitor one or more incoming messages in one or more computing devices; detect one or more assessment vectors embedded in the one or more incoming messages; initiate an isolated virtual environment, in response to detecting one or more assessment vectors in the one or more incoming messages; redirect the one or more incoming messages associated with the one or more assessment vectors from the one or more computing devices to the isolated virtual machine; trigger an access routine to emulate, within the isolated virtual environment, an action of accessing the one or more incoming messages; determine, based on at least the access routine, whether the one or more incoming messages is associated with malware; and transmit control signals configured to cause a computing device of a user to display a notification indicating whether the one or more incoming messages is associated with malware.

In some embodiments, the at least one processing device is further configured to trigger the access routine, wherein triggering further comprises: initiate a machine learning model on the one or more assessment vectors associated with the one or more incoming messages; classify, using the machine learning model, the one or more assessment vectors into a predetermined class label based on at least one or more classification parameters, wherein the predetermined class label is associated with malware; and determine that the one or more incoming messages is associated with malware based on at least classifying the one or more assessment vectors into the predetermined class label.

In some embodiments, the at least one processing device is further configured to: initiate a machine learning algorithm on one or more historical assessment vectors; electronically receive, from the computing device of the user, one or more predetermined class labels, wherein the one or more predetermined class labels indicate ground truth of whether the one or more historical assessment vectors are associated with malware or not; and train, using the machine learning algorithm, the machine learning model using the one or more historical assessment vectors and the one or more predetermined class labels, wherein training further comprises determining the one or more classification parameters for the machine learning model.

In some embodiments, the at least one processing device is further configured to: detect a first assessment vector embedded in a first incoming message in a first computing device; determine a first set of computing resources associated with the first computing device; initiate an isolated virtual environment, wherein initiating further comprises emulating a virtual computing environment having one or more resources that is identical to the first set of computing resources.

In some embodiments, redirecting the one or more incoming messages further comprises blocking access to the one or more incoming messages via the one or more computing devices.

In some embodiments, the at least one processing device is further configured to: determine, based on at least the access routine, that the one or more incoming messages is associated with malware; and automatically initiate one or more mitigation actions to mitigate or eliminate the threat posed by the malware.

In some embodiments, the at least one processing device is further configured to: determine, based on at least the access routine, that the one or more incoming messages is not associated with malware; and redirect the one or more incoming messages associated with the one or more assessment vectors from the isolated virtual machine to the one or more computing devices.

In some embodiments, the at least one processing device is further configured to: continuously monitor the one or more incoming messages in a communication exchange server associated with the technology infrastructure; detect the one or more assessment vectors embedded in the one or more incoming messages at the communication exchange server; and redirect the one or more incoming messages associated with the one or more assessment vectors from the communication exchange server to the isolated virtual machine.

In another aspect, a computer program product for active detection and mitigation of unauthorized activity within a technology infrastructure is presented. The computer program product comprising a non-transitory computer-readable medium comprising code causing a first apparatus to: continuously monitor one or more incoming messages in one or more computing devices; detect one or more assessment vectors embedded in the one or more incoming messages; initiate an isolated virtual environment, in response to detecting one or more assessment vectors in the one or more incoming messages; redirect the one or more incoming messages associated with the one or more assessment vectors from the one or more computing devices to the isolated virtual environment; trigger an access routine to emulate, within the isolated virtual environment, an action of accessing the one or more incoming messages; determine, based on at least the access routine, whether the one or more incoming messages is associated with malware; and transmit control signals configured to cause a computing device of a user to display a notification indicating whether the one or more incoming messages is associated with malware.

In yet another aspect, a method for active detection and mitigation of unauthorized activity within a technology infrastructure is presented. The method comprising: continuously monitoring one or more incoming messages in one or more computing devices; detecting one or more assessment vectors embedded in the one or more incoming messages; initiating an isolated virtual environment, in response to detecting one or more assessment vectors in the one or more incoming messages; redirecting the one or more incoming messages associated with the one or more assessment vectors from the one or more computing devices to the isolated virtual environment; triggering an access routine to emulate, within the isolated virtual environment, an action of accessing the one or more incoming messages; determining, based on at least the access routine, whether the one or more incoming messages is associated with malware; and transmitting control signals configured to cause a computing device of a user to display a notification indicating whether the one or more incoming messages is associated with malware.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
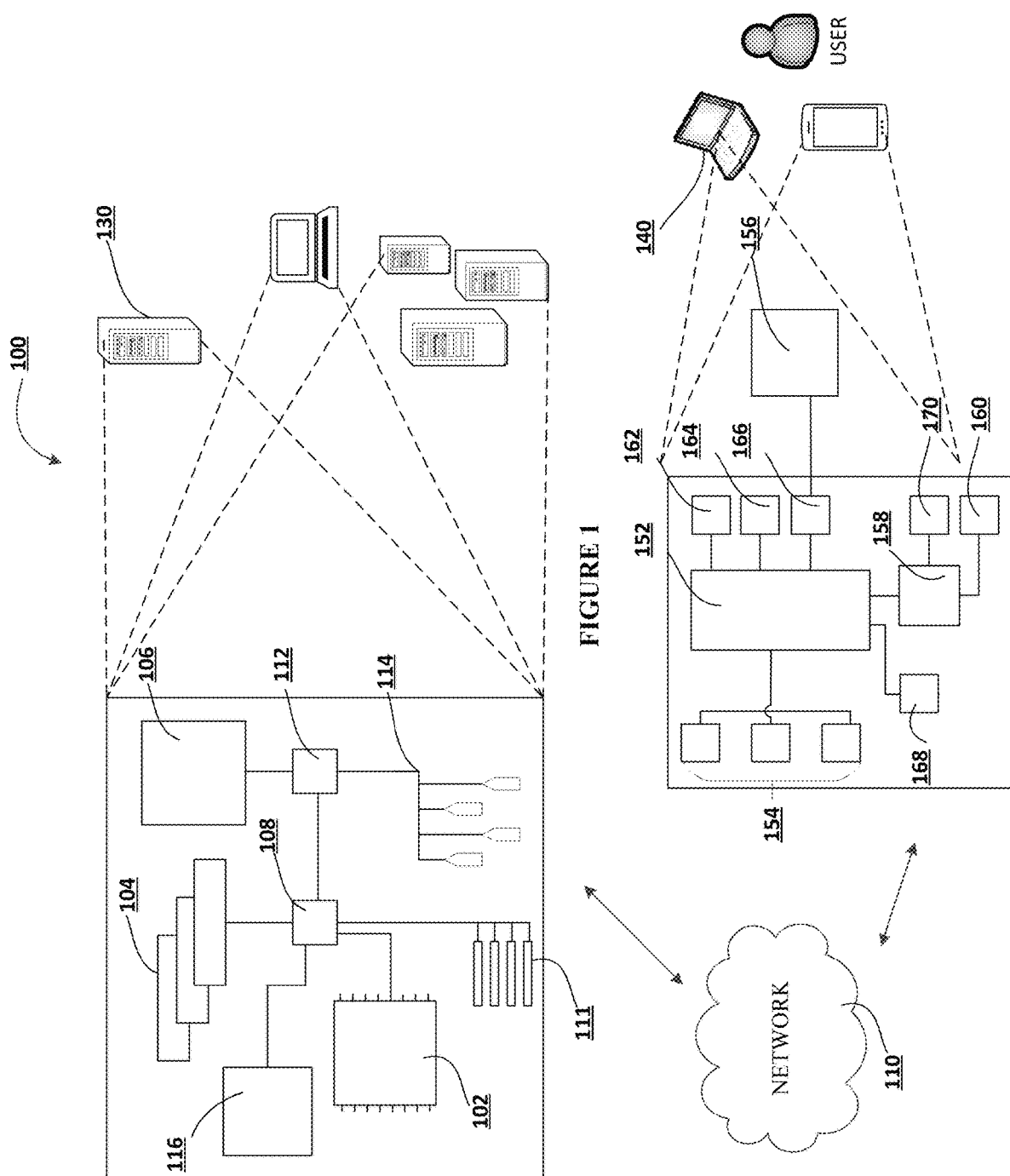
Figure 2:
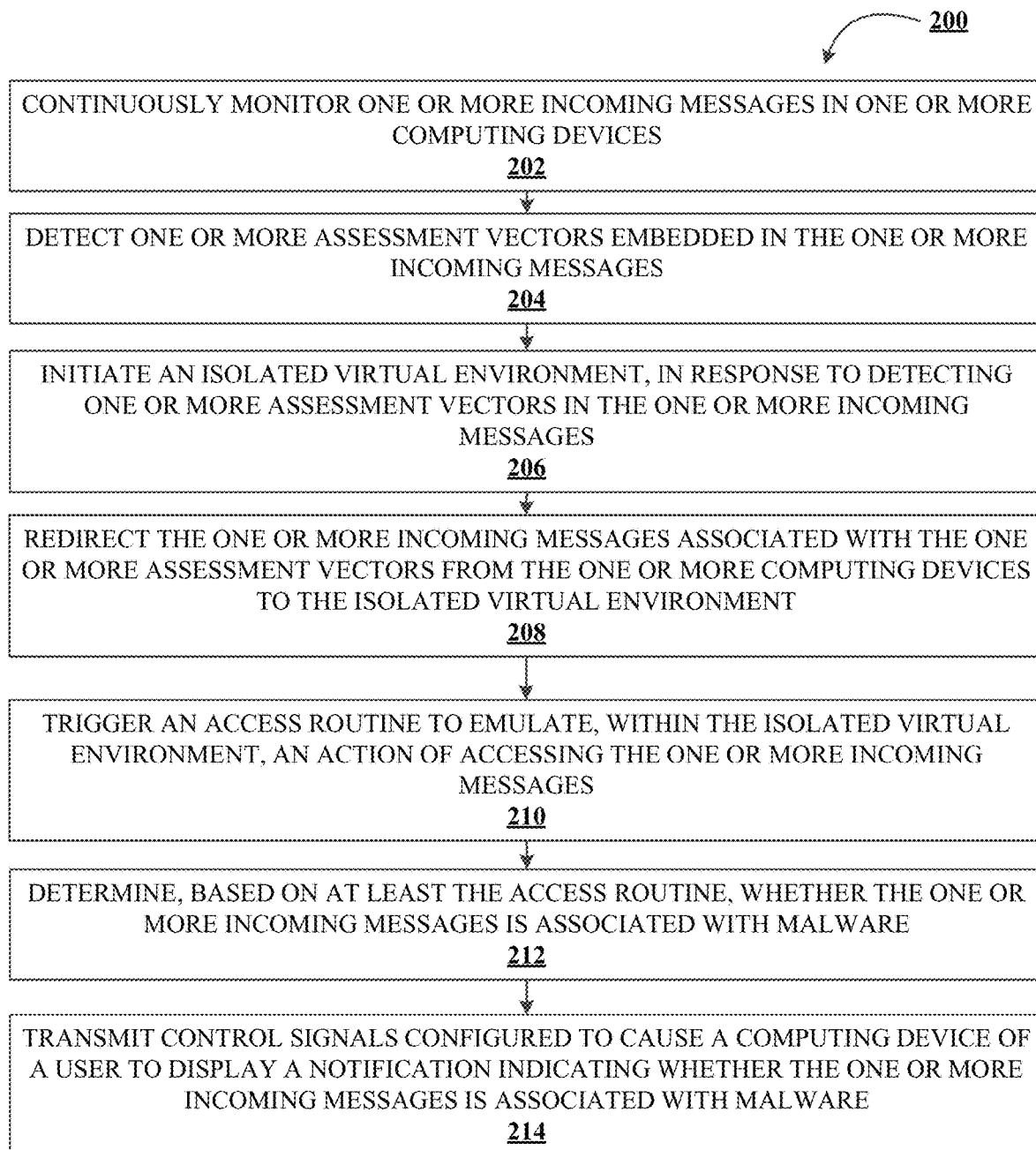
Figure 3:
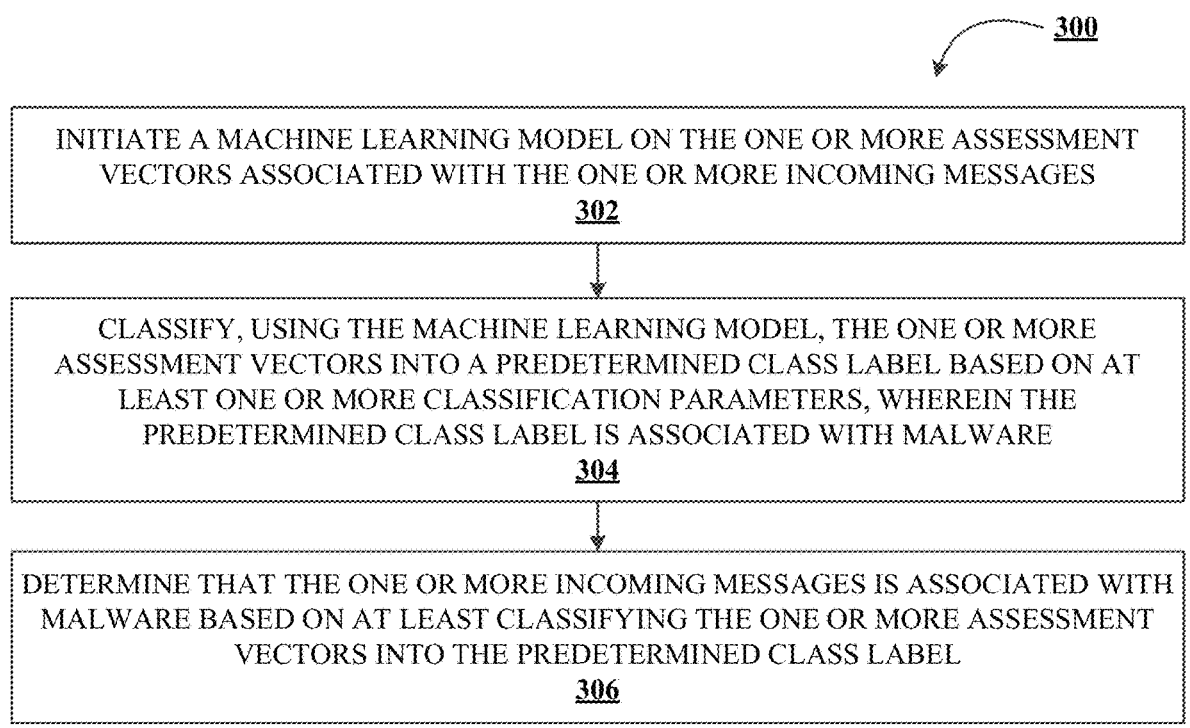

Having thus described embodiments of the invention in general terms, reference will now be made the accompanying drawings, wherein:

FIG. 1 illustrates technical components of a system for active detection and mitigation of unauthorized activity within a technology infrastructure, in accordance with an embodiment of the invention;

FIG. 2 illustrates a process flow for active detection and mitigation of unauthorized activity within a technology infrastructure, in accordance with an embodiment of the invention; and FIG. 3 illustrates a process flow for triggering the access routine within a technology infrastructure, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may refer to electronic components associated with the technology infrastructure (e.g., system environment described herein) of the entity. These electronic components include software components such as applications, databases, data files, and/or the like, hardware components such as computing devices, network devices, and/or the like, network components such as server, client, peer, transmission medium, connecting devices, and/or the like, and any other electronic component associated with the technology infrastructure.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Malware software that is specifically designed to disrupt, damage, or gain unauthorized access to a computer system. Wrongdoers gain access to a computer network and install the malware on a computing system. Once the malware is executed (i.e., detonated) it performs a designated nefarious action, such as, misappropriate information, such as user credentials, user passwords or the like. Other forms of malware provide for backdoor access to computing systems, such that normal authentication is no longer required to access the system and, as a result the wrongdoer can remotely access resources within an application, such as databases, file servers or the like, providing the wrongdoers the ability to remotely issue system commands.

One specific type of malware that is becoming increasingly prevalent is ransomware. Ransomware uses a technique called cryptoviral extortion, in that, the software encrypts the victim's files, making them inaccessible, and demands a ransom payment, typically in the form of digital currencies, in order to decrypt the files. From the entity's perspective, not only are ransomware attacks costly in terms of the ransom payment, they also result in other impacts to the entity, such as negative exposure and the like.

Current defense mechanisms to prevent malware attacks and, specifically, ransomware attacks have proven to be less than desirable. Typically, antivirus software or the like is implemented as the means by which entities attempt to prevent malware attacks. Most antivirus software is designed to look for specific indicators, such as specific digital signatures of known malware software and, in response to detecting a digital signature, take appropriate action, such as communicating alerts, isolating computing systems/devices or the like. However, by the time a specific digital signature is detected, and appropriate action is taken, it is often too late. The detection of these other indicators tends to be a reactive means of defense, in that, the malware software is likely to have already been installed in the system and, in some instances, may already be executing or execution is imminent.

Therefore, a need exists to develop systems, methods, computer program products and the like which are capable of detecting the onset of malware, specifically ransomware, activity, such that preventive actions can be taken prior to the execution/detonation of the malware/ransomware on the computing system. Accordingly, the present invention provides the functional benefit of isolating any incoming message with potential malware indicators (e.g., assessment vectors) within a virtual environment. Once isolated, the present invention determines whether the incoming message may be associated with any malware. In doing so, the present invention allows the detection and mitigation process to happen immediately when the incoming message is received by computing devices associated with the entity (e.g., at the communication exchange server) before it is received by the intended recipient. In addition, such detection and mitigation happen within the confines of an isolated virtual environment that is sandboxed from the rest of the technology infrastructure.

FIG. 1 presents an exemplary block diagram of the system environment for active detection and mitigation of unauthorized activity within a technology infrastructure 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

In some embodiments, the system 130 may include one or more applications that are capable of creating an operational sandbox environment (e.g., isolated virtual environment) using virtual servers to test for an mitigate the effects of malware embedded in incoming message. The operational sandbox environment is typically isolated from the rest of the technology infrastructure (e.g., system environment 100). The system 130 has the capability of redirecting information to and from the operational sandbox environment without compromising the integrity of the other computing devices within the technology infrastructure.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for active detection and mitigation of unauthorized activity within a technology infrastructure 200, in accordance with an embodiment of the invention. As shown in block 202, the process flow includes continuously monitoring one or more incoming messages in one or more computing devices. Large entities typically use electronic means of communication with external third parties such as suppliers, partners, and customers on a regular basis. For purposes of this invention, any electronic communication received from such third parties are referred to as incoming messages. These incoming messages may be in the form of electronic mail, file transfers, and/or the like.

In some embodiments, any external communication received by the entity is captured within a communication exchange server. A communication exchange server may be central hub where the incoming messages are initially received by the entity (and temporarily stored). In other words, the communication exchange server may be a gateway for external bi-directional communication for computing devices within the technology infrastructure of the entity. The incoming messages are then transmitted to their respective destinations (computing devices) within the technology infrastructure from the communication exchange server. In specific embodiments (e.g., embodiments involving electronic mail), the system may be configured to monitor a communication exchange server associated with the technology infrastructure for incoming messages.

Next, as shown in block 204, the process flow includes detecting one or more assessment vectors embedded in the one or more incoming messages. In some embodiments, the assessment vectors may include uniform resource locators (URLs), file attachments, specific code or code triggers that automatically initiate a process on the computing device, and/or the like. Not all assessment vectors embedded in incoming messages are malicious in nature. Some assessment vectors are expected and provide value to the entity. However, some assessment vectors may be malicious in nature. Such assessment vectors are artifacts of evidence that may indicate that the incoming message is associated with some form of unauthorized, malicious, and/or suspicious activity. In specific embodiments (e.g., embodiments involving electronic mail), the assessment vectors may present themselves in the form of unidentifiable uniform resource locators (URLs), unverifiable file attachments, specific verbiage previously identified to be associated with malicious activity, and/or the like. In some other embodiments, the assessment vectors may present themselves in the form of hidden code embedded within file attachments or URLs that when triggered, could modify process, file names, hashes, network connection to a command and control server, Internet Protocol (IP) addresses, event logs, registry key values, and/or the like. In some embodiments, the assessment vectors may not be associated with Next, as shown in block 206, the process flow includes initiating an isolated virtual environment, in response to detecting one or more assessment vectors in the one or more incoming messages. To determine whether the identified assessment vectors are malicious in nature, the system may be configured to leverage the advantages of an isolated virtual environment to create a sandbox that enables users to run programs or execute files without affecting the application, system or platform on which they run.

In some embodiments, the system may be configured to detect a first assessment vector embedded in a first incoming message in a first computing device. In response, the system may be configured to determine a first set of computing resources associated with the first computing device. Accordingly, the system may be configured to initiate the isolated virtual environment by emulating a virtual computing environment having one or more resources that is identical to the first set of computing resources.

Next, as shown in block 208, the process flow includes redirecting the one or more incoming messages associated with the one or more assessment vectors from the one or more computing devices to the isolated virtual environment. In some embodiments, by redirecting the one or more incoming messages to the isolated virtual environment, the system may be configured to block access to the one or more incoming messages via the one or more computing devices. In specific embodiments (e.g., embodiments involving electronic mail), the system may be configured to redirect the incoming messages associated with the assessment vectors from the communication exchange server to the isolated virtual environment before the incoming message is delivered to the recipient computing device within the technology infrastructure.

Next, as shown in block 210, the process flow includes triggering an access routine to emulate, within the isolated virtual environment, an action of accessing the one or more incoming messages. By emulating the actions of a real user within the confines of an isolated virtual environment, the system may be configured to evaluate the assessment vector for any potential unauthorized, malicious, and/or suspicious activity. In this way, the recipient computing devices within the technology infrastructure that would have otherwise received the incoming messages are protected from misappropriation. This also protects the rest of the networked computing devices within the technology infrastructure that could be affected by virtue of their networking capabilities with the recipient computing devices.

Next, as shown in block 212, the process flow includes determining, based on at least the access routine, whether the one or more incoming messages is associated with malware. In some embodiments, the system may be configured to determine, based on at least the access routine, that the incoming messages are associated with malware. In response, the system may be configured to automatically initiate one or more mitigation actions to mitigate or eliminate any issues posed by the malware. In some embodiments, the mitigation actions may be implemented within the isolated virtual environment. In other embodiments, the mitigation actions may be implemented outside the isolated virtual environment. In still other embodiments, the mitigation actions may be implemented in both the isolated virtual environment and outside the isolated virtual environment. For example, the mitigation actions may include tagging and blocking the incoming message from being redirected back to the recipient computing device within the technology infrastructure, deleting the incoming message from the communication exchange server permanently, extracting source information from the incoming message such as sender name, sender IP address, and/or the like, extracting metadata from the incoming message, and/or the like. On the other hand, the system may be configured to determine that the incoming messages are not associated with malware. In response, the system may be configured to redirect the incoming messages associated with the one or more assessment vectors from the isolated virtual environment back to the one or more computing devices (recipient computing devices).

Next, as shown in block 214, the process flow includes transmitting control signals configured to cause a computing device of a user to display a notification indicating whether the one or more incoming messages is associated with malware.

FIG. 3 illustrates a process flow for triggering the access routine within a technology infrastructure 300, in accordance with an embodiment of the invention. As shown in block 302, the process flow includes initiating a machine learning model on the one or more assessment vectors associated with the one or more incoming messages. As described herein, the machine learning model may refer to a mathematical model generated by machine learning algorithms based on training data, to make predictions or decisions without being explicitly programmed to do so. In some embodiments, the system may be configured to generate the machine learning model by implementing one or more machine learning algorithms capable of receiving an analyzing input data to predict output values within an acceptable range.

Accordingly, to generate the machine learning model capable of determining whether the one or more incoming messages is associated with malware, the system may be configured to determine one or more historical assessment vectors. For each historical assessment vector, the system may be configured to receive, from the computing device of the user, one or more predetermined class labels. In some embodiments, the predetermined class labels are used to indicate ground truth of whether a historical assessment vector is associated with malware or not. In some other embodiments, the predetermined class labels are used to identify the type of malware. The historical assessment vectors and the corresponding predetermined class labels form the training dataset for the machine learning model. In response to receiving the predetermined class labels, the system may be configured to train the machine learning model using the training dataset by initiating the machine learning algorithm on the training dataset. Once trained, the system may be configured to determine classification parameters for the machine learning model that are then used to classify unseen assessment vectors.

Next, as shown in block 304, the process flow includes classifying, using the machine learning model, the one or more assessment vectors into a predetermined class label based on at least one or more classification parameters, wherein the predetermined class label is associated with malware. In some embodiments, the predetermined class label may indicate type of malware.

Next, as shown in block 306, the process flow includes determining that the one or more incoming messages is associated with malware based on at least classifying the one or more assessment vectors into the predetermined class label. In embodiments where the predetermined class labels indicate the type of malware, the system may be configured to identify the specific type of malware embedded in the incoming message to choose the applicable mitigation action to be implemented.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for active detection and mitigation of unauthorized activity within a technology infrastructure, the system comprising:
    a processor;
    a non-transitory storage device containing instructions that, when executed by the processor, cause the processor to:
        continuously monitor one or more incoming messages at a communication server associated with one or more computing devices;
        detect one or more assessment vectors embedded in the one or more incoming messages, wherein the one or more assessment vectors are in an unidentifiable uniform resource locators (URLs), file attachments, and specific verbiage previously identified to be associated with malicious activity, and wherein the one or more assessment vectors are hidden code embedded within the file attachments and/or unidentifiable URLs that when triggered, modifies process, file names, hashes, network connection to a command and control server, Internet Protocol (IP) addresses, event logs, and registry key values;
        initiate an isolated virtual environment, in response to detecting the one or more assessment vectors in the one or more incoming messages;
        redirect the one or more incoming messages associated with the one or more assessment vectors from the communication server to the isolated virtual environment before the one or more incoming messages is delivered to the one or more computing devices;
        trigger an access routine to emulate, within the isolated virtual environment, an action of accessing the one or more incoming messages;
        determine, based on at least the access routine, whether the one or more incoming messages is associated with malware;
        automatically initiate a first subset of one or more mitigation actions in the isolated virtual environment and a second subset of the one or more mitigation actions outside the isolated virtual environment to mitigate or eliminate any issues posed by the malware, wherein the first subset of the one or more mitigation actions and the second subset of the one or more mitigation actions comprises at least tagging and blocking the one or more incoming messages from being redirected back to the one or more computing devices within the technology infrastructure, deleting the one or more incoming messages from the communication server permanently, extracting source information from the one or more incoming messages, and extracting metadata from the one or more incoming messages, wherein the source information from the one or more incoming messages comprises as sender name and sender IP address; and
        transmit control signals configured to cause a computing device of a user to display a notification indicating whether the one or more incoming messages is associated with malware.

2. The system of claim 1, wherein the instructions, when executed by the processor, further cause the processor to trigger the access routine, wherein triggering further comprises:
    initiate a machine learning model on the one or more assessment vectors associated with the one or more incoming messages;
    classify, using the machine learning model, the one or more assessment vectors into a predetermined class label based on at least one or more classification parameters, wherein the predetermined class label is associated with malware; and
    determine that the one or more incoming messages is associated with malware based on at least classifying the one or more assessment vectors into the predetermined class label.

3. The system of claim 2, wherein the instructions, when executed by the processor, further cause the processor to:
    initiate a machine learning algorithm on one or more historical assessment vectors;
    electronically receive, from the computing device of the user, one or more predetermined class labels, wherein the one or more predetermined class labels indicate ground truth of whether the one or more historical assessment vectors are associated with malware or not; and
    train, using the machine learning algorithm, the machine learning model using the one or more historical assessment vectors and the one or more predetermined class labels, wherein training further comprises determining the one or more classification parameters for the machine learning model.

4. The system of claim 1, wherein the instructions, when executed by the processor, further cause the processor to:
    detect a first assessment vector embedded in a first incoming message in a first computing device;
    determine a first set of computing resources associated with the first computing device; and
    initiate an isolated virtual environment, wherein initiating further comprises emulating a virtual computing environment having one or more resources that is identical to the first set of computing resources.

5. The system of claim 1, wherein redirecting the one or more incoming messages further comprises blocking access to the one or more incoming messages via the one or more computing devices.

6. The system of claim 1, wherein the instructions, when executed by the processor, further cause the processor to:

determine, based on at least the access routine, that the one or more incoming messages is associated with malware; and automatically initiate one or more mitigation actions to mitigate or eliminate any issues posed by the malware.

7. The system of claim 1, wherein the instructions, when executed by the processor, further cause the processor to:

determine, based on at least the access routine, that the one or more incoming messages is not associated with malware; and redirect the one or more incoming messages associated with the one or more assessment vectors from the isolated virtual environment to the one or more computing devices.

8. The system of claim 1, wherein the instructions, when executed by the processor, further cause the processor to:

continuously monitor the one or more incoming messages in a communication exchange server associated with the technology infrastructure;

detect the one or more assessment vectors embedded in the one or more incoming messages at the communication exchange server; and redirect the one or more incoming messages associated with the one or more assessment vectors from the communication exchange server to the isolated virtual environment.

9. A computer program product for active detection and mitigation of unauthorized activity within a technology infrastructure, the computer program product comprising a non-transitory computer-readable medium comprising code causing a first apparatus to:

continuously monitor one or more incoming messages at a communication server associated with one or more computing devices;

detect one or more assessment vectors embedded in the one or more incoming messages, wherein the one or more assessment vectors are in an unidentifiable uniform resource locators (URLs), file attachments, and specific verbiage previously identified to be associated with malicious activity, and wherein the one or more assessment vectors are hidden code embedded within the file attachments and/or unidentifiable URLs that when triggered, modifies process, file names, hashes, network connection to a command and control server, Internet Protocol (IP) addresses, event logs, and registry key values;

initiate an isolated virtual environment, in response to detecting the one or more assessment vectors in the one or more incoming messages;

redirect the one or more incoming messages associated with the one or more assessment vectors from the communication server to the isolated virtual environment before the one or more incoming messages is delivered to the one or more computing devices;

trigger an access routine to emulate, within the isolated virtual environment, an action of accessing the one or more incoming messages;

determine, based on at least the access routine, whether the one or more incoming messages is associated with malware;

automatically initiate a first subset of one or more mitigation actions in the isolated virtual environment and a second subset of the one or more mitigation actions outside the isolated virtual environment to mitigate or eliminate any issues posed by the malware, wherein the first subset of the one or more mitigation actions and the second subset of the one or more mitigation actions comprises at least tagging and blocking the one or more incoming messages from being redirected back to the one or more computing devices within the technology infrastructure, deleting the one or more incoming messages from the communication server permanently, extracting source information from the one or more incoming messages, and extracting metadata from the one or more incoming messages, wherein the source information from the one or more incoming messages comprises as sender name and sender IP address; and transmit control signals configured to cause a computing device of a user to display a notification indicating whether the one or more incoming messages is associated with malware.

10. The computer program product of claim 9, wherein the code further causes the first apparatus to trigger the access routine, wherein triggering further comprises:

initiate a machine learning model on the one or more assessment vectors associated with the one or more incoming messages;

classify, using the machine learning model, the one or more assessment vectors into a predetermined class label based on at least one or more classification parameters, wherein the predetermined class label is associated with malware; and determine that the one or more incoming messages is associated with malware based on at least classifying the one or more assessment vectors into the predetermined class label.

11. The computer program product of claim 10, wherein the code further causes the first apparatus to:

initiate a machine learning algorithm on one or more historical assessment vectors;

electronically receive, from the computing device of the user, one or more predetermined class labels, wherein the one or more predetermined class labels indicate ground truth of whether the one or more historical assessment vectors are associated with malware or not; and train, using the machine learning algorithm, the machine learning model using the one or more historical assessment vectors and the one or more predetermined class labels, wherein training further comprises determining the one or more classification parameters for the machine learning model.

12. The computer program product of claim 9, wherein the code further causes the first apparatus to:

detect a first assessment vector embedded in a first incoming message in a first computing device;

determine a first set of computing resources associated with the first computing device; and initiate an isolated virtual environment, wherein initiating further comprises emulating a virtual computing environment having one or more resources that is identical to the first set of computing resources.

13. The computer program product of claim 9, wherein redirecting the one or more incoming messages further comprises blocking access to the one or more incoming messages via the one or more computing devices.

14. The computer program product of claim 9, wherein the code further causes the first apparatus to:

determine, based on at least the access routine, that the one or more incoming messages is associated with malware; and automatically initiate one or more mitigation actions to mitigate or eliminate any issues posed by the malware.

15. The computer program product of claim 9, wherein the code further causes the first apparatus to:
- determine, based on at least the access routine, that the one or more incoming messages is not associated with malware; and
- redirect the one or more incoming messages associated with the one or more assessment vectors from the isolated virtual environment to the one or more computing devices.

16. The computer program product of claim 9, wherein the code further causes the first apparatus to:
- continuously monitor the one or more incoming messages in a communication exchange server associated with the technology infrastructure;
- detect the one or more assessment vectors embedded in the one or more incoming messages at the communication exchange server; and
- redirect the one or more incoming messages associated with the one or more assessment vectors from the communication exchange server to the isolated virtual environment.

17. A method for active detection and mitigation of unauthorized activity within a technology infrastructure, the method comprising:
- continuously monitoring one or more incoming messages at a communication server associated with one or more computing devices;
- detecting one or more assessment vectors embedded in the one or more incoming messages, wherein the one or more assessment vectors are in an unidentifiable uniform resource locators (URLs), file attachments, and specific verbiage previously identified to be associated with malicious activity, and wherein the one or more assessment vectors are hidden code embedded within the file attachments and/or unidentifiable URLs that when triggered, modifies process, file names, hashes, network connection to a command and control server, Internet Protocol (IP) addresses, event logs, and registry key values;
- initiating an isolated virtual environment, in response to detecting the one or more assessment vectors in the one or more incoming messages;
- redirecting the one or more incoming messages associated with the one or more assessment vectors from the communication server to the isolated virtual environment before the one or more incoming messages is delivered to the one or more computing devices;
- triggering an access routine to emulate, within the isolated virtual environment, an action of accessing the one or more incoming messages;
- determining, based on at least the access routine, whether the one or more incoming messages is associated with malware;
- automatically initiating a first subset of one or more mitigation actions in the isolated virtual environment and a second subset of the one or more mitigation actions outside the isolated virtual environment to mitigate or eliminate any issues posed by the malware, wherein the first subset of the one or more mitigation actions and the second subset of the one or more mitigation actions comprises at least tagging and blocking the one or more incoming messages from being redirected back to the one or more computing devices within the technology infrastructure, deleting the one or more incoming messages from the communication server permanently, extracting source information from the one or more incoming messages, and extracting metadata from the one or more incoming messages, wherein the source information from the one or more incoming messages comprises as sender name and sender IP address; and
- transmitting control signals configured to cause a computing device of a user to display a notification indicating whether the one or more incoming messages is associated with malware.

18. The method of claim 17, wherein the method further comprises triggering the access routine, wherein triggering further comprises:
- initiating a machine learning model on the one or more assessment vectors associated with the one or more incoming messages;
- classifying, using the machine learning model, the one or more assessment vectors into a predetermined class label based on at least one or more classification parameters, wherein the predetermined class label is associated with malware; and
- determining that the one or more incoming messages is associated with malware based on at least classifying the one or more assessment vectors into the predetermined class label.

19. The method of claim 18, wherein the method further comprises:
- initiating a machine learning algorithm on one or more historical assessment vectors;
- electronically receiving, from the computing device of the user, one or more predetermined class labels, wherein the one or more predetermined class labels indicate ground truth of whether the one or more historical assessment vectors are associated with malware or not; and
- training, using the machine learning algorithm, the machine learning model using the one or more historical assessment vectors and the one or more predetermined class labels, wherein training further comprises determining the one or more classification parameters for the machine learning model.

20. The method of claim 17, wherein the method further comprises:
- detecting a first assessment vector embedded in a first incoming message in a first computing device;
- determining a first set of computing resources associated with the first computing device; and
- initiating an isolated virtual environment, wherein initiating further comprises emulating a virtual computing environment having one or more resources that is identical to the first set of computing resources.

* * * * *